United States Patent
Wang et al.

(10) Patent No.: US 8,314,805 B2
(45) Date of Patent: Nov. 20, 2012

(54) CONTROL METHOD AND COMPUTER SYSTEM FOR SWITCHING DISPLAY BETWEEN OSS

(75) Inventors: Bibo Wang, Beijing (CN); Yongfeng Liu, Beijing (CN); Chunmei Liu, Beijing (CN); Jun Chen, Beijing (CN); Zhuqiang Wang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 1002 days.

(21) Appl. No.: 12/341,471

(22) Filed: Dec. 22, 2008

(65) Prior Publication Data

US 2009/0167773 A1    Jul. 2, 2009

(30) Foreign Application Priority Data

Jan. 2, 2008    (CN) .......................... 2008 1 0055940

(51) Int. Cl.
*G06T 1/60* (2006.01)
*G06F 13/14* (2006.01)
*G06F 9/455* (2006.01)

(52) U.S. Cl. ........ 345/530; 345/520; 715/718; 715/751; 715/778; 715/781; 715/783; 718/1; 710/1

(58) Field of Classification Search ................ 345/520; 718/1
See application file for complete search history.

(56) References Cited

U.S. PATENT DOCUMENTS

| | | | |
|---|---|---|---|
| 2005/0210158 A1* | 9/2005 | Cowperthwaite et al. | 710/1 |
| 2007/0143754 A1* | 6/2007 | Imada et al. | 718/1 |
| 2008/0088636 A1* | 4/2008 | Ho | 345/530 |

* cited by examiner

*Primary Examiner* — Daniel Washburn
*Assistant Examiner* — Donna Ricks
(74) *Attorney, Agent, or Firm* — Dickstein Shapiro LLP

(57) ABSTRACT

The present invention provides a control method for switching display between a plurality of OSs as well as a computer system. The method comprises: detecting that the currently displayed guest operating system (GOS) is required to be switched from a first GOS to a second GOS; determining whether the first GOS satisfies a preset switching condition, and switching the currently displayed GOS to the second GOS if the preset switching condition is satisfied, and otherwise, prohibiting the switching from the currently displayed GOS. With the method and the computer system, it is possible to avoid picture distortion or blurring or system collapse in switching display between a plurality of OSs.

14 Claims, 2 Drawing Sheets

CONTROL METHOD AND COMPUTER SYSTEM FOR SWITCHING DISPLAY BETWEEN OSS

BACKGROUND OF THE INVENTION

1. Field of Invention

The present invention relates to the field of multi-OS (Operating System) display technology, in particular to a control method for switching display between a plurality of OSs as well as a computer system.

2. Description of Prior Art

Multiple GOSs (Guest Operating Systems) can be concurrently running on one and the same hardware platform by using virtualization technology. The display content from the multiple GOSs can be outputted via one display card device to an external display apparatus for displaying, that is, the multiple GOSs can implement their own display, respectively, by sharing the same display card device.

The conventional technique in the virtualization domain is to let all of the GOSs use virtual display cards, while only one host OS uses the physical display card device. This method has disadvantages including very poor display performance for the GOSs and no support for many acceleration characteristics.

New techniques have been proposed so that the GOSs can use the physical display card device directly. But such techniques are enabled at the expense that only one of the GOSs can enjoy display output, while the rest cannot make any output via the display card.

To address the above problem, some techniques are gradually developed, with which all of the GOSs can use the physical display card device directly in certain manner like operating in series. These techniques can be specifically divided into two categories, one is separating display resources, e.g., display memory resources, among the GOSs by modifying device drivers, and the other is not separating display resources.

No matter which category of the above technique is adopted, displayed pictures may be distorted or blurred during the process of switching from one GOS to another. Even system collapse may happen sometimes.

SUMMARY OF THE INVENTION

The object of embodiments of the present invention is to provide a control method for switching display between a plurality of OSs as well as a computer system, so as to avoid picture distortion or blurring or system collapse in switching display between the plurality of OSs.

To achieve the above object, one embodiment of the present invention provides a control method for switching display between a plurality of OSs, comprising:

detecting that the currently displayed guest operating system (GOS) is required to be switched from a first GOS to a second GOS;

determining whether the first GOS satisfies a preset switching condition, and switching the currently displayed GOS to the second GOS if the preset switching condition is satisfied, and otherwise, prohibiting to switch the currently displayed GOS.

One embodiment of the present invention further provides a computer system, comprising:

at least two guest operating systems (GOSs) including a first GOS and a second GOS;

a virtual machine manager connected to each of the at least two GOSs;

a display card for displaying output for the at least two GOSs;

the first GOSs includes a switching monitor unit for, upon detecting that the currently displayed GOS is required to be switched from the first GOS to the second GOS, determining whether the first GOS satisfies a preset switching condition, and permitting the OS switching if the preset switching condition is satisfied, and otherwise, prohibiting the OS switching;

the computer system further comprises a switching unit for switching the GOS displayed via the display card from the first GOS to the second GOS when the switching monitor unit permits the OS switching.

One or more embodiments of the present invention achieve the following advantages.

Before a switching operation, determination is made as to whether the preset switching condition is satisfied, and the switching can be allowed only when the preset switching condition is satisfied. Therefore, a reliable switching operation is guaranteed, and situations like picture distortion or system collapse can be prevented.

In the case that the respective GOSs use separated display resources, modification on device drivers are prohibited from users or other programs. In this way, it is guaranteed that a background GOS will use display resources in accordance with a proper version of the device driver and cause no influence on the display of a foreground GOS.

In the case that part of display resources are shared among the respective GOSs, the switching operation is not allowed if the program executed by the currently displayed GOS occupies the shared part of display resources. This ensures a reliable switching operation. Further, it is guaranteed that no influence from the background GOS will be imposed on the display of the foreground GOS, by forbidding the background GOS from using the first system function and opening a switching protection window for the background GOS.

DETAILED DESCRIPTION OF PREFERRED EMBODIMENTS

With the control method for switching display between a plurality of OSs and the computer system according to the embodiments of the present invention, a display switching monitor unit is additionally provided to determine whether the currently displayed GOS satisfies a preset switching condition before the actual OS switching. In this way, it is possible to ensure a secure switching operation and prevent picture distortion or system collapse in the context of a physical display card being used by a plurality of virtual OSs.

Now, more detailed illustration is given to different embodiments of the present invention with reference to the figures.

<The First Embodiment>

In this embodiment, a situation where individual GOSs use different display resources is exemplified. Here, the display resources include display memory resource, display pipe, etc. The display pipe refers to a set of display control registers in a display card, in which registers information on display mode parameters is stored. The display mode parameters include resolution, refresh rate, color depth, information about display memory used in displaying content. A current display card generally has two or more sets of display pipes.

To enable the respective GOSs to using different display resources, the device driver for each GOS must be modified in advance to bind the GOS with its corresponding display resource. As such, each GOS can access the corresponding display resource based on its device driver.

Figure 1:
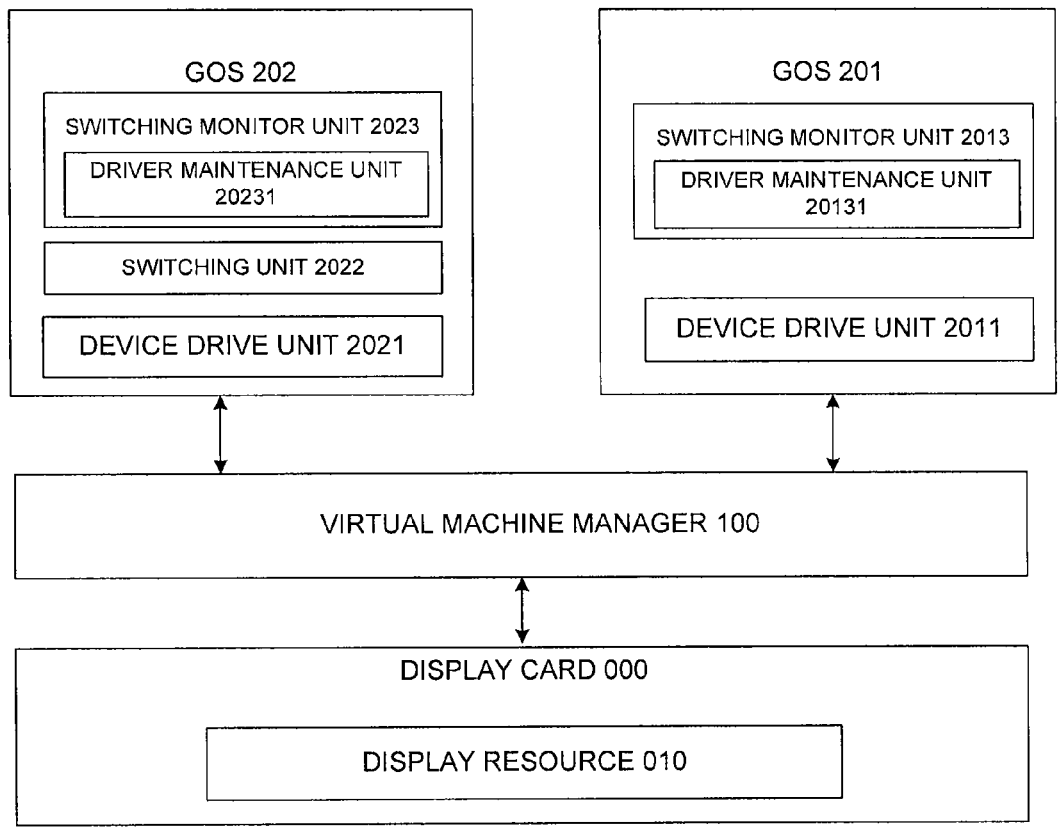
FIG. 1 is a schematic block diagram of a computer system according to the first embodiment of the present invention.

As shown in FIG. 1, the computer system of the first embodiment of the present invention comprises two GOSs 201 and 202, a virtual machine manager 100 and a display card 000. The GOSs 201 and 202 are each connected to the virtual machine manager 100, which is in turn connected to the display card 000. Both of the GOSs 201 and 202 directly access the display card via the virtual machine manager 100, so that the displays for the GOSs are outputted via the display card to an external display device, such as a display.

The display card 100 contains display resource 010 which can be, for example, display memory or display pipe, and the like. The GOSs 201 and 202 each include device drive unit 2011 and 2021 for saving configuration information on display resource in the device drivers for the GOSs and for providing services to the GOSs for operating the display card, respectively. Each of the GOSs uses different display resource of the display card depending on its device driver.

Herein, a switching unit 2022 and a switching monitor unit 2023 are further provided in the GOS 202.

Below, a description will be given to the control of a switching process by the present embodiment, by example of switching the currently displayed GOS from the GOS 202 to the GOS 201.

The switching monitor unit 2023, upon detecting that the currently displayed GOS is required to be switched from the GOS 202 to the GOS 201, determines whether the GOS 202 satisfies a preset switching condition, and permits the OS switching if the preset switching condition is satisfied, and otherwise, prohibits the OS switching.

Since the GOSs have modified their device drivers in advance, each of them uses different display resource of the display card depending on the corresponding device driver. Only when the device driver has a proper version and stays at a normal operation status, it can be guaranteed that the background GOS uses its corresponding display resource according to the device driver (i.e., legally use display resource of the display card) and imposes no effect on the display of the foreground GOS, thereby preventing occurrence of picture distortion or system collapse. In view of this, the preset switching condition is that the device driver of the GOS 202 has a proper version and stays at a normal operation status. If the user or other program re-modifies the device driver in such a manner that the GOS cannot access its corresponding display resource, the version of the device driver becomes incorrect. A typical example where the device driver stays at an abnormal status is that the user changes configuration related to display memory location and the like in a registry.

The switching unit 2022 switches the GOS displayed via the display card from the GOS 202 to the GOS 201 when the switching monitor unit 2033 permits the OS switching.

To prevent the user or other program from manipulating the device driver in an inappropriate way, a driver maintenance unit 20231 is included in the switching monitor unit 2023 in the GOS 202 of FIG. 1 for, after the switching unit 2022 has switches the currently displayed GOS to the GOS 201, invoking the device management program of the GOS 202, opening the property setting interface of device driver of the GOS 202, and setting an update prohibiting property via the property setting interface to prohibit any update of the device driver of the GOS 202.

Similarly, a switching monitor unit 2013 is provided in the GOS 201, and a driver maintenance unit 20131 is provided in the switching monitor unit 2013. The switching monitor unit 2013 and the driver maintenance unit 20131 perform similar functions to those of the switching monitor unit 2023 and the driver maintenance unit 20231, respectively, when the GOS 201 is switched from the foreground display to the background.

Figure 2:
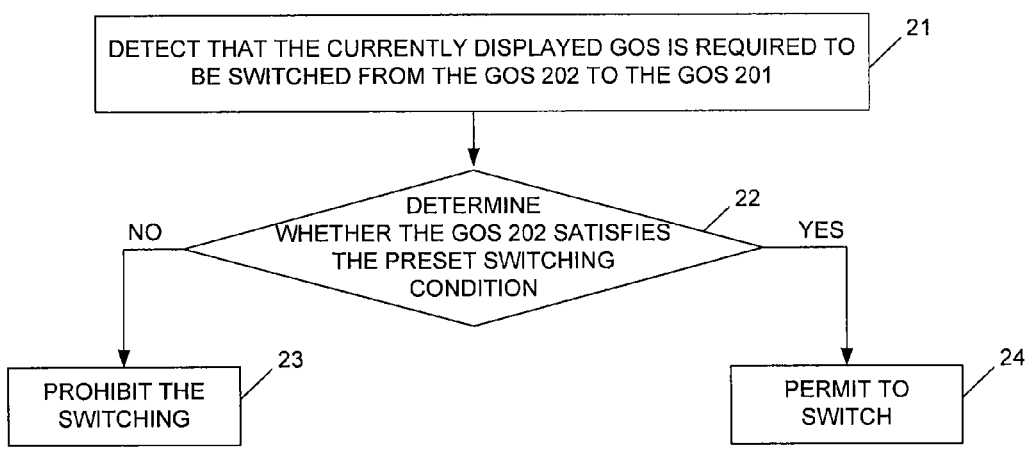
FIG. 2 is a flowchart of a control method for switching display between a plurality of OSs according to the first embodiment of the present invention.

FIG. 2 shows a flowchart of a control method for switching display between a plurality of OSs based on the above computer system. The method comprises the following steps:

Step 21, detecting that the currently displayed GOS is required to be switched from the GOS 202 to the GOS 201;

Step 22, determining whether the device driver of the GOS 202 has a proper version and stays at a normal operation status, and proceeding to step 24 in the case of a proper version and a normal operation status; and otherwise, proceeding to step 23;

Step 23, prohibiting the switching from the currently displayed GOS and ending the flow;

Step 24, permitting to switch the currently displayed GOS.

After the switching of the currently displayed GOS, the step 24 can further include step 25 of invoking the device management program of the GOS 202, opening the property setting interface of device driver of the GOS 202, and setting an update prohibiting property via the property setting interface to prohibit any update of the device driver of the GOS 202.

As can be seen from the above description, by making the determination before the OS switching, it can be guaranteed that the GOS 202 uses its corresponding display resource according to a device driver of legal version after it has been switched to the background. As such, the GOS 201 displayed in foreground will not be affected, thereby ensuring reliability and security for the foreground display.

<The Second Embodiment>

In this embodiment, a situation where individual GOSs share part of display resources is exemplified.

Figure 3:
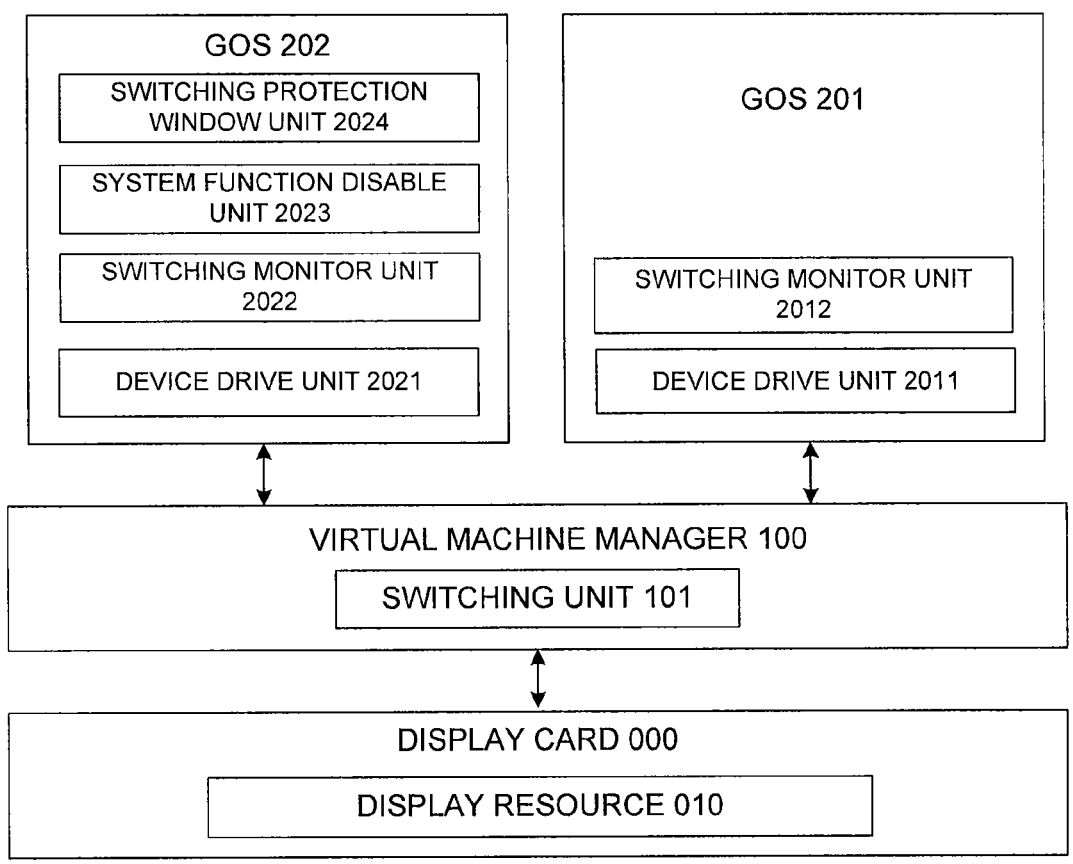
FIG. 3 is a schematic block diagram of a computer system according to the second embodiment of the present invention.

As shown in FIG. 3, the computer system of the second embodiment of the present invention also comprises two GOSs 201 and 202, a virtual machine manager 100 and a display card 000. The GOSs 201 and 202 are each connected to the virtual machine manager 100, which is in turn connected to the display card 000. Both of the GOSs 201 and 202 directly access the display card via the virtual machine manager 100, so that the displays for the GOSs are outputted via the display card to an external display device, such as a display. Similarly to that shown in FIG. 1, the display card 100 contains display resource 010 which can be, for example, display memory or display pipe, and the like.

The GOSs 201 and 202 each include device drive unit 2011 and 2021 for saving configuration information on display resource in the device drivers for the GOSs and for providing services to the GOSs for operating the display card, respectively. Each of the GOSs uses display resource of the display card depending on its device driver, and the display resources corresponding to each of the GOSs contain a shared portion. For example, the GOSs use the same or partially the same display memory resource (display pipe).

Here, switching monitor units 2010 and 2022 are provided in the GOSs 201 and 202, respectively. A switching unit 101 is provided in the virtual manager 100. Further, the GOS 202 is provided with a system function disable unit 2023 and a switching protection window unit 2024.

Below, a description will be given to the control of a switching process by the present embodiment, by example of switching the currently displayed GOS from the GOS 202 to the GOS 201.

The switching monitor unit 2012, upon detecting that the currently displayed GOS is required to be switched from the GOS 202 to the GOS 201, determines whether the GOS 202 satisfies a preset switching condition, and permits the OS switching if the preset switching condition is satisfied, and otherwise, prohibits the OS switching.

In this embodiment, part of the display resources used by the GOSs is shared between them. So, one of the GOSs cannot execute a first type of program if it is to be switched from the foreground to the background. Here, the first type of program will occupy the shared display resource of the GOSs during its execution. In view of this, the preset switching condition in this embodiment is that the GOS 202 is currently not running a first type of program. Specifically, the first type of program comprises programs such as Direct3D.

After the switching monitor unit 2022 has determined that the GOS 202 satisfies the preset switching condition, the system function disable unit 2023 sets the first system function of the GOS 202 as a disabled status to prohibit the GOS 202 from using the first system function, which will disturb a normal foreground display of the GOS 201 while being used at the background by the GOS 202. Specifically, the first system function comprises screen protection function, display timing power supply management function, 3D display acceleration function, display output port configuration function, and the like.

The switching protection window unit 2024 generates a switching protection window after the switching monitor unit 2022 has determined that the GOS 202 satisfies the preset switching condition, and prohibits the GOS 202 from generating any window other than the switching protection window after the GOS 202 has been switched to the background. Specifically, the switching protection window can be a window using less display resource, such as a full black screen window, Ctrl+Alt+Del window and the like. With such switching protection window, any request for the display output from the background OS can be blocked.

The switching unit 101 switches the GOS displayed via the display card from the GOS 202 to the GOS 201 when the switching monitor unit 2012 permits the OS switching.

The control method for switching display between a plurality of OSs based on the above computer system comprises the following steps:

Step 41, detecting that the currently displayed GOS is required to be switched from the GOS 202 to the GOS 201;

Step 42, determining whether the GOS 202 has a first type of program running, and proceeding to step 43 with a positive answer; and otherwise, proceeding to step 44;

Step 43, prohibiting the switching from the currently displayed GOS and ending the flow;

Step 44, setting, by the GOS 202, its first system function as a disabled status to prohibit use of the first system function, which will disturb a normal foreground display of the GOS 201 while being used at the background by the GOS 202;

Step 45, generating a switching protection window by the GOS 202;

Step 46, switching the currently displayed GOS from the GOS 202 to the GOS 201;

Step 47, prohibiting the GOS 202 from generating any window other than the switching protection window after the GOS 202 has been switched to the background.

The foregoing illustrates how to make the determination before the actual switching action in the case that the GOSs share part of the display resources. In this embodiment, it is reliably guaranteed that the background GOS will cause no disturbance to the display of the foreground GOS by disabling the first system function and generating the switching protection window.

The foregoing description is only the preferred embodiments of the present invention and not intended to limit the present invention. Those ordinarily skilled in the art will appreciate that any modification or substitution in the principle of the present invention shall fall into the scope of the present invention defined by the appended claims.

What is claimed is:

1. A control method for switching display between a plurality of OSs, comprising:
   detecting that the currently displayed Guest Operating System (GOS) is required to be switched from a first GOS to a second GOS;
   determining whether the first GOS satisfies a preset switching condition, and
   switching the currently displayed GOS to the second GOS if the preset switching condition is satisfied, and otherwise prohibiting the switching from the currently displayed GOS,
   wherein, in the case that the first and second GOSs use different display resources of a display card according to their device driver, respectively, the preset switching condition is that the device driver of the first GOS has a proper version and stays at a normal operation status.

2. The control method according to claim 1, wherein the display resources include display memory resource and display pipe.

3. The control method according to claim 1, after switching of the currently displayed GOS from the first GOS to the second GOS, further comprising:
   invoking a device management program of the first GOS, and opening a property setting interface of the device driver of the first GOS; and
   setting an update prohibiting property via the property setting interface to prohibit any update of the device driver of the first GOS.

4. A control method for switching display between a plurality of OSs, comprising:
   detecting that the currently displayed Guest Operating System (GOS) is required to be switched from a first GOS to a second GOS;
   determining whether the first GOS satisfies a preset switching condition, and
   switching the currently displayed GOS to the second GOS if the preset switching condition is satisfied, and otherwise prohibiting the switching from the currently displayed GOS,
   wherein, in the case that the first and second GOSs share part of the display resources, the preset switching condition is that the first GOS is currently not execute a first type of program which will occupy the shared display resource of the first and second GOSs during its execution.

5. The control method according to claim 4, when the preset switching condition is satisfied, further comprising:
   setting a first system function of the first GOS as a disabled status to prohibit the first GOS from using the first system function which will disturb a normal foreground display of the second GOS while being used at the background by the first GOS.

6. The control method according to claim 5, wherein the first system function comprises screen protection function, display timing power supply management function, 3D display acceleration function, or display output port configuration function.

7. The control method according to claim 4, when the preset switching condition is satisfied, further comprising:
generating a switching protection window by the first GOS.

8. The control method according to claim 7, after switching the currently displayed GOS from the first GOS to the second GOS, further comprising:
prohibiting the first GOS from generating any window other than the switching protection window.

9. A computer system comprising:
at least two Guest Operating Systems (GOSs) including a first GOS and a second GOS;
a virtual machine manager connected to each of the at least two GOSs;
a display card for displaying output for the at least two GOSs;
a switching monitor unit for, upon detecting that the currently displayed GOS is required to be switched from the first GOS to the second GOS, determining whether the first GOS satisfies a preset switching condition, and permitting the OS switching if the preset switching condition is satisfied, and otherwise, prohibiting the OS switching; and
a switching unit for switching the GOS displayed via the display card from the first GOS to the second GOS when the switching monitor unit permits the OS switching,
wherein, in the case that the first and second GOSs use different display resources of the display card according to their device driver, respectively, the preset switching condition is that the device driver of the first GOS has a proper version and stays at a normal operation status.

10. The computer system according to claim 9, wherein the display resources include display memory resource or display pipe.

11. The computer system according to claim 9, wherein the switching monitor unit includes a driver maintenance unit for, after switching of the currently displayed GOS from the first GOS to the second GOS, invoking a device management program of the first GOS, opening a property setting interface of the device driver of the first GOS, and setting an update prohibiting property via the property setting interface to prohibit any update of the device driver of the first GOS.

12. A computer system comprising:
at least two Guest Operating Systems (GOSs) including a first GOS and a second GOS;
a virtual machine manager connected to each of the at least two GOSs;
a display card for displaying output for the at least two GOSs;
a switching monitor unit for, upon detecting that the currently displayed GOS is required to be switched from the first GOS to the second GOS, determining whether the first GOS satisfies a preset switching condition, and permitting the OS switching if the preset switching condition is satisfied, and otherwise, prohibiting the OS switching; and
a switching unit for switching the GOS displayed via the display card from the first GOS to the second GOS when the switching monitor unit permits the OS switching,
wherein, in the case that the first and second GOSs share part of the display resources, the preset switching condition is that the first GOS is currently not execute a first type of program which will occupy the shared display resource of the first and second GOSs during its execution.

13. The computer system according to claim 12, wherein the first GOS further includes a system function disable unit for, after the switching monitor unit has determined that the first GOS satisfied the preset switching condition, setting a first system function of the first GOS as a disabled status to prohibit the first GOS from using the first system function which will disturb a normal foreground display of the second GOS while being used at the background by the first GOS.

14. The computer system according to claim 12, wherein the first GOS further includes a switching protection window unit for generating a switching protection window after the switching monitor unit has determined that the first GOS satisfied the preset switching condition, and prohibiting the first GOS from generating any window other than the switching protection window after the first GOS has been switched to the background.

* * * * *